April 21, 1936.  E. E. WEMP  2,038,017
CLUTCH STRUCTURE
Original Filed Aug. 10, 1934
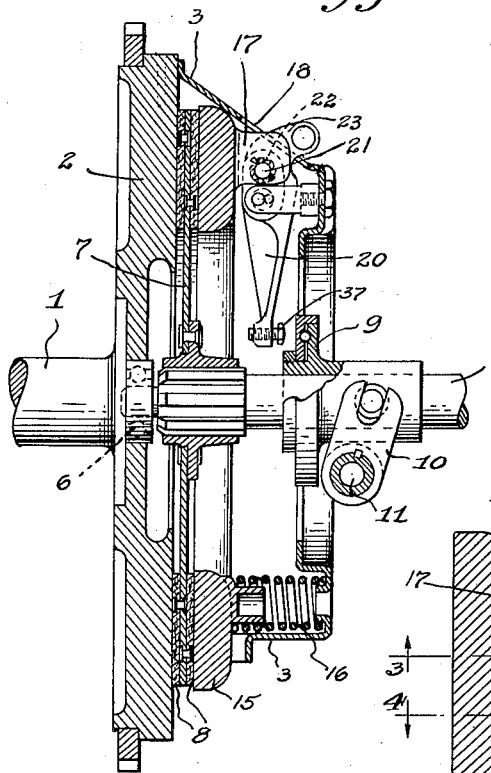
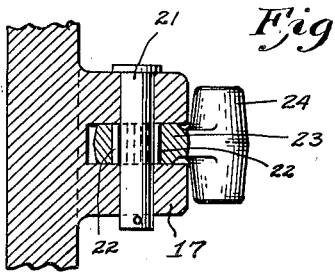
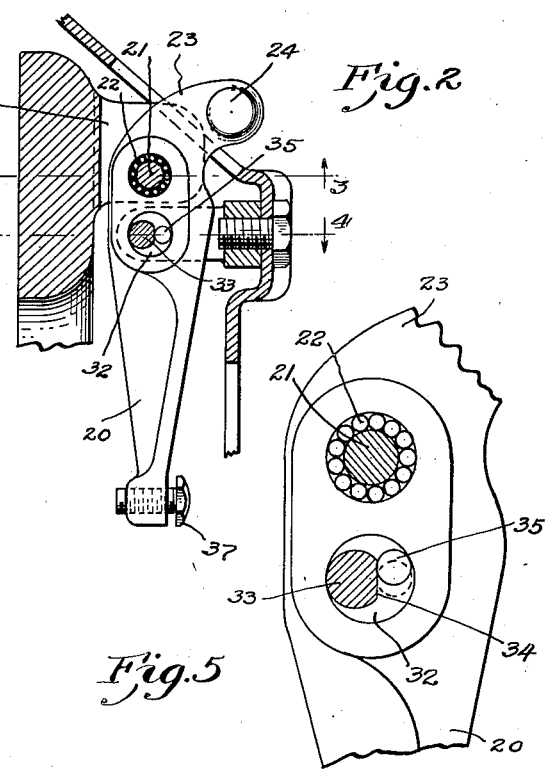
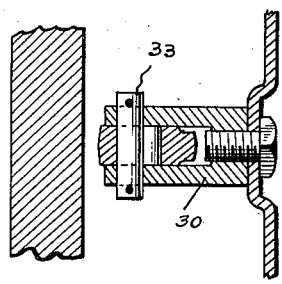
INVENTOR.
Ernest E. Wemp
BY
Barnes, Kisselle, Laughlin & Raisch
ATTORNEYS Patented Apr. 21, 1936

2,038,017

UNITED STATES PATENT OFFICE 2,038,017

CLUTCH STRUCTURE

Ernest E. Wemp, Detroit, Mich.

Original application August 10, 1934, Serial No. 739,241. Divided and this application June 27, 1935, Serial No. 28,591

6 Claims. (Cl. 192—99)

This invention relates to a clutch structure and it has to do particularly with a structure which embodies the mounting of clutch releasing levers. This application is a division of application Serial No. 739,241 filed August 10, 1934.

The invention is directed to a structure where a member of rigid construction is shifted axially by means of one or more levers, each pivotally connected to the member and each having a fulcrum. Where a lever is mounted upon a fixed fulcrum and can only shift with respect thereto by rocking or rotating on the fulcrum, the load point and the point where the power is applied, necessarily moves in an arc around the fulcrum. Thus, in a clutch, if the point of pivotal connection with the shiftable clutch member be considered the load point, the point tends to swing in an arc around the fulcrum of the lever, but due to the rigid construction of the clutch member this point is constrained to move in a straight line parallel to the axis. This clash of movements has heretofore been taken care of by providing open type pivots, either at the fulcrum, load point, or both, capable of some sliding action, or by mounting the lever fulcrum on a member capable of rocking. The above used term "open pivot" is intended to describe a structure where the lever merely has a contact on one side and is free on the opposite side, so that the force to be applied by the lever may be exerted only in one direction.

The principal object of the present invention is to provide a lever mounting wherein both the fulcrum and the connection with the shiftable clutch member may be of the closed type, yet which structure compensates for the clash between straight line movements and the arcuate movements without mounting one of the connections, for example the fulcrum, on a rockable or shiftable support. In specifying that the connections are of the closed type, I intend to describe a connection for the fulcrum, load point or power point, which is, generally speaking, of the full journal type, in that the connection is positive, power may be applied in opposite directions to the point of connection, and in some instances the lever, if otherwise free, may be capable of rotating around any such point. This is to distinguish from the above termed open type of connection which is a pivotal point only on one side of the lever and from which the lever may be lifted.

It is a further object of the invention to provide a structure wherein the lever fulcrums and the connections between the levers and the shiftable clutch member are of the anti-friction type employing in each instance rolling anti-friction bearing members. These rolling anti-friction bearings function advantageously, particularly when the levers are shifted to release the clutch against the usual packing springs. This makes for ease of operation in releasing the clutch and minimizes the wear which would otherwise be caused by relative sliding or slipping surfaces. Other objects will appear as the detailed description progresses in connection with the accompanying drawing.

Fig. 1 is a vertical sectional view taken through a clutch constructed in accordance with the invention.

Fig. 2 is an enlarged detailed view showing a lever and lever mounting.

Fig. 3 is a sectional view taken on line 3—3 of Fig. 2.

Fig. 4 is a sectional view taken on line 4—4 of Fig. 2.

Fig. 5 is an enlarged view showing the lever mounting and illustrating different positions of a rolling element in one of the connections.

The clutch may be associated with the usual fly-wheel of an internal combustion engine, the crank-shaft of such an engine being illustrated at 1 and the fly-wheel at 2. A cover plate for the clutch is shown at 3 arranged to be bolted to the fly-wheel by means of cap screws or the like (not shown). A driven shaft is shown at 5, one end of which may be piloted in the fly-wheel as at 6, and upon the driven shaft is mounted a clutch driven disc 7 having facing material 8 to be packed between the fly-wheel and a clutch pressure plate. A clutch throw-out bearing is illustrated at 9, the same being reciprocally mounted upon the shaft 5 arranged to be shifted to the left as Fig. 1 is viewed by means of a yoke 10 mounted upon a clutch operating shaft 11 and which is to be rocked by a clutch lever actuated by the foot of the operator in the usual manner. The lever is not shown.

The structure, thus far described, may be of any conventional design, and this structure is shown merely for the purpose of providing a showing with which to associate the novel clutch structure.

A clutch pressure plate is illustrated at 15, and a number of clutch packing springs 16 are, in the structure herein, disposed between the clutch pressure plate and the cover plate for packing the pressure plate against the driven disc with the driven disc held packed between the pressure plate and the fly-wheel. The pressure plate, of course, is a driving member and it may be driven by bosses 17 which may be integral with the pressure plate and which slidably fit in apertures 18 in the cover plate.

The bosses 17 may be of bifurcated formation and a clutch releasing lever may be mounted between the portions of each boss. Such a lever is shown at 20, of which there may be three in number. Each lever may be connected to the pressure plate as shown in Fig. 3 wherein a pin 21 serves to mount the lever pivotally and the pivotal mounting preferably includes an anti-friction bearing structure and thus may employ needle type rollers 22. In the form shown herein, each lever is provided with an unbalanced centrifugal weight and to this end each lever may have a part 23 extending out through the adjacent slot 18 in the cover plate. These parts 23 extend outwardly and rearwardly of the pivotal mounting of the lever to provide the unbalanced centrifugal weight arrangement and may terminate in enlarged head portions 24. The levers are fulcrumed on the cover plate. A structure for thus mounting the levers may take the form of a bifurcated bracket 30, and as shown herein each lever is provided with a relatively large aperture 32. A pin 33 may extend through the aperture and the pin is securely held by the bifurcated arms of the bracket 30. This pin 33 has a flat side 34 and a roller 35 is positioned in the aperture 32 and arranged to contact with and roll upon the flat surface 34. The inner end of each lever is adapted to be contacted with by a throw out bearing 9 so that the levers may be rocked clockwise as Fig. 1 is viewed as the throw out bearing 9 is shifted to the left, the levers rocking upon the fulcrum point supported by the brackets 30, thus shifting the pressure plate away from the fly-wheel to release the driven disc from packing pressure and thus disengage the clutch. Screw thread adjusting members 37, one for each lever, may be associated with the inner end of each lever so that in the assembly of the clutch, a proper clearance adjustment may be maintained with respect to the throw out bearing 9.

The outward centrifugal force of the levers, as a whole, is taken by the pressure plate through the pivot pins 21. This relieves the cover plate, which would otherwise have to take this force, through the yokes 30 acting as cantilevers, and such force would flex or distort the cover plate. It would be undesirable to make the cover plate of heavier, stronger stock to take such outward centrifugal force.

It will at once be appreciated that inasmuch as the pressure plate is of solid construction, the pivotal connection as at 21 must shift axially on a straight line. This would clash with the arcuate movement of the portion of the lever at this point if the lever was on a fixed fulcrum point. In order to compensate for this, the fulcrum bearing structure embodying the flat-sided pin 33 and roller 35 is provided. The pin 33 and roller 35 fit somewhat loosely in the aperture 32. In other words, the diameter of the aperture 32 is slightly greater in length than the diameter of the roller 35 plus the dimension of the pin 33 measured diametrically from the flat face thereof to the opposite side of the pin 33. This structure, it will be observed, constitutes a floating anti-friction fulcrum which permits the levers to shift bodily as they rock. If the levers are rocked to release the clutch the rollers 35 are under compression but they have a rolling action on the flat sides of the pins 33, and with respect to the walls of the apertures in the levers. This is advantageous from several standpoints; it makes for ease of operation; it eliminates sliding or rubbing action as the levers shift bodily, thus minimizing wear on the parts. After the clutch has been engaged by the springs, there is no further substantial movement of the levers, since the centrifugal masses merely increase the effective clutch packing pressure without any appreciable pivotal action. Theoretically, there may be some pivotal action due to the compression of the facings on the driven disc or other parts, but this is infinitesimal. Accordingly, when force is communicated to the pin 33 by the unbalanced centrifugal masses, there is no appreciable lever movement and no rubbing between the pin 33 and the wall of the apertures in the lever.

In the parent application there is a detailed disclosure and claims on a clutch having spring packing means and unbalanced centrifugal weights for providing clutch packing pressure. Although the levers herein are shown with such weights, as at 24, the lever mounting, the novelty of which particularly resides in that structure embodying the pin 34 and roller 35 and the associated environment, may be used in the clutch with or without the unbalanced centrifugal weights.

The flat sided pin 32 has become conveniently known as a D pin and the roller 35 functions on the flat side of the D. In the normal operation of the clutch when it is rotating the rollers 35 are subjected to centrifugal force as they are more or less loose in the space between the flat side of the D pin and the wall of the aperture 32. As a result, these rollers are thrown outwardly and assume the position somewhat as illustrated by the full lines of Fig. 5. Fig. 5 may be somewhat exaggerated. Now when the clutch is released by a shift of the throw out bearing 9, as Fig. 1 is viewed, the rollers 35 are under compression, and as the levers rock the rollers roll along on the flat surface of the D pin and ultimately may assume the position similar to that shown by the dotted lines of Fig. 5. Due to the looseness of the D pin and roller in the aperture 32 the leavers are capable of shifting bodily with respect to the fulcrum. Thus the levers shift and compensate for the straight line movement of the pivotal connection at 21. As the clutch is permitted to engage, the rollers 35 remain under compression, as the levers restrain the advancement of the pressure plate by the springs and they again roll on the D pin in an outward direction. As a result, the rollers 35 are normally in a position so that they are capable of maximum inward roll upon release of the clutch, and this minimizes the looseness or clearances. In a structure which has been made commercially the roller 35 has a maximum rolling action of about $\frac{1}{32}$ of an inch on the D pin, which gives about $\frac{1}{16}$ of an inch total radial bodily shift of the levers.

It is, of course, to be appreciated that the D pin and roller structure may be used either at the fulcrum or at the point of connection with the pressure plate. However, it is preferred to employ this structure at the connection which is carried by the cover plate, which in this instance is the fulcrum. The reason for this is that when the clutch is operating there is considerable centrifugal force tending to throw the levers outwardly. The needle bearing on the pressure plate overcomes this outward force leaving the fulcrum structure loose. The pressure plate, being of a relatively heavy mass of metal, is well adapted to overcome this force. Thus the cover plate and fulcrum are relieved of this force. Otherwise, the outward centrifugal force, if taken at the fulcrum, would have to be overcome by the cover plate. This would require a stronger and heavier cover plate, particularly inasmuch as the yokes 30 would act upon the cover plate in a cantilever manner. By employing the D pin and roll structure at the fulcrum and which is carried by the cover plate, the cover plate does not have to be built to meet this force and as a result may be of lighter stock and of cheaper construction.

While we have above pointed out that the connections are of the so-called closed type, it is to be appreciated that these connections or bearings might be open between the two opposite side portions which actually take the thrust in lever movements, and it is intended to cover this arrangement by the use of the term "closed".

It will be apparent that the flat surface of the pin does not have to be exactly flat as some convexity or some concavity might be permitted and still get the same rolling action and travel. I, therefore, use the term "flat" in the sense of a cut-away portion in the pin which is coordinated with the shape of the aperture to permit limited travel of the roller to permit the shifting action of the lever contemplated.

I claim:

1. In a clutch, a pressure plate, a clutch releasing lever, a fixed fulcrum bearing for the lever, a pivotal bearing between the lever and the pressure plate, said lever having an aperture, one of said bearings comprising a pin fixedly supported and having a roller travel surface on one side of the pin and a roller located on the roller travel surface of the pin between such surface and the wall of the aperture and arranged to permit a limited travel of the roller on such surface between the pin and the aperture to permit bodily shift of the lever.

2. In a clutch, a driving member shiftable axially to engage and release the clutch, clutch releasing levers, fulcrum supporting means for each lever, each lever having a pivotal connection with the pressure plate and a pivotal connection to the fulcrum supporting means, one of said connections comprising a fixed pivotal structure and the other of said connections comprising a fixed pivot pin with a flat side, a roller member functioning on said flat side of the fixed pivot pin, the lever having an aperture in which the fixed pin and roller member are located somewhat loosely whereby to provide movement bodily of the lever in its actuation.

3. In a clutch, a pressure plate, a clutch releasing lever, a fixed fulcrum supporting means for the lever, a pivotal connection between the lever and the pressure plate, said lever having an aperture therein, a flat sided fulcrum pin carried by the fulcrum supporting means having a diameter less than the diameter of the aperture in the lever and located in said aperture, and a roller member also located in said aperture in the lever and acting upon the flat side of the pivot pin.

4. In a clutch, a pressure plate, a clutch releasing lever, a fixed fulcrum supporting means for the lever, a pivotal connection between the lever and the pressure plate, said lever having an aperture therein, a fulcrum pin with a cut-away side carried by the fulcrum supporting means having a diameter less than the diameter of the aperture in the lever and located in said aperture, and a roller also located in said aperture in the lever and acting upon the cut-away side of the pivot pin, the diameter of the roller member plus the dimension of the pivot pin measured diametrically from its cut-away side being somewhat less than the diameter of the aperture in the lever.

5. A pivotal mounting for a lever for accommodating movement in a straight line of a portion of the lever as it is actuating upon the said mounting comprising, a D pin, said lever having an aperture therein having a diameter substantially greater than that of the D pin and in which the D pin is located, and a roller member positioned in said aperture and acting upon the flat side of the D pin, the diameter of the roller plus the diameter of the pivot pin measured diametrically through the flat face of the D pin being less than the diameter of the aperture in the lever.

6. A pivot mounting for a lever or the like comprising, a pin with a cut-away side, a roller member functioning on the cut-away side of the pin, a member with an aperture in which the pin and roller are located for forming a fulcrum point, said pin and roller being somewhat loose in the aperture whereby to permit relative movement between the pin and the said member.

ERNEST E. WEMP.